(12) United States Patent
Jenness et al.

(10) Patent No.: US 9,500,280 B2
(45) Date of Patent: Nov. 22, 2016

(54) PISTON RING FOR AN INTERNAL COMBUSTION ENGINE

(71) Applicant: Federal-Mogul Corporation, Southfield, MI (US)

(72) Inventors: Blair Matthew Jenness, Grosse Pointe Park, MI (US); Matthew Ryan Pedigo, Howell, MI (US); Troy Kantola, Whitmore Lake, MI (US)

(73) Assignee: Federal-Mogul Corporation, Southfield, MI (US)

( * ) Notice: Subject to any disclaimer, the term of this patent is extended or adjusted under 35 U.S.C. 154(b) by 469 days.

(21) Appl. No.: 13/768,535

(22) Filed: Feb. 15, 2013

(65) Prior Publication Data

US 2013/0213222 A1    Aug. 22, 2013

Related U.S. Application Data

(60) Provisional application No. 61/600,285, filed on Feb. 17, 2012.

(51) Int. Cl.
*F16J 9/00* (2006.01)
*F16J 9/20* (2006.01)
(Continued)

(52) U.S. Cl.
CPC ............... *F16J 9/20* (2013.01); *F02F 1/004* (2013.01); *F02F 1/20* (2013.01); *F02F 5/00* (2013.01)

(58) Field of Classification Search
CPC ............... F16J 9/20; F16J 9/206; F16J 9/02; F16J 9/064; F16J 9/00; F02F 1/004; F02F 1/20; F02F 2001/006; F02F 5/00

USPC .......................................... 277/909, 436–439
See application file for complete search history.

(56) References Cited

U.S. PATENT DOCUMENTS 580,090 A    4/1897    Lewis
945,233 A    1/1910    Hatch
(Continued)

FOREIGN PATENT DOCUMENTS

CN    2427635 Y    4/2001
DE    10213106 A1    10/2003
(Continued)

OTHER PUBLICATIONS

International Search Report, mailed Jul. 1, 2013 (PCT/US2013/026361).

*Primary Examiner* — Michael Leslie
*Assistant Examiner* — Dustin T Nguyen
(74) *Attorney, Agent, or Firm* — Robert L. Stearns; Dickinson Wright, PLLC

(57) ABSTRACT

A piston ring for sealing a cylinder wall to a piston body is provided. The piston ring includes a ring body of an elastically deformable material which extends substantially circumferentially around an axis and has an inner face that faces the axis. The inner face includes a plurality of axially spaced and radially inwardly extending contact features. The ring body configured to bias the contact features into engagement with the piston body to establish a seal therebetween. At least one of the contact features extends substantially continuously around a circumference for establishing a substantially continuous seal around the piston body, and at least one of the contact features is non-continuous and has at least one recessed area for allowing the passage of oil and gas therethrough.

10 Claims, 6 Drawing Sheets

(51) Int. Cl.
*F02F 1/00* (2006.01)
*F02F 1/20* (2006.01)
*F02F 5/00* (2006.01)

(56) References Cited

U.S. PATENT DOCUMENTS

| | | | |
|---|---|---|---|
| 1,015,502 A | | 1/1912 | Meaker |
| 1,218,132 A | | 3/1917 | Tuhey |
| 1,337,651 A | * | 4/1920 | Hartog ............ 277/461 |
| 1,436,130 A | | 11/1922 | Webb |
| 1,477,120 A | * | 12/1923 | Hanson ........ F16J 9/20 |
| | | | 277/461 |
| 1,682,130 A | | 1/1926 | Johnston |
| 1,796,603 A | * | 3/1931 | Junkers ........ 123/196 R |
| 1,871,820 A | * | 8/1932 | Morton ............ 277/500 |
| 1,959,769 A | | 5/1934 | Simmen |
| 2,426,613 A | | 8/1945 | Jackson |
| 2,514,016 A | | 7/1950 | Casado |
| 3,548,721 A | | 12/1970 | Eisennegger |
| 3,777,722 A | | 12/1973 | Lenger |
| 4,516,481 A | * | 5/1985 | Geffroy et al. ........ 92/212 |
| 7,735,834 B2 | * | 6/2010 | Hofbauer ............ 277/438 |
| 2007/0125323 A1 | | 6/2007 | Hofbauer |
| 2010/0326391 A1 | | 12/2010 | Mierisch et al. |

FOREIGN PATENT DOCUMENTS

| | | | |
|---|---|---|---|
| DE | 102009007751 A1 | | 8/2010 |
| FR | 2699600 A1 | | 6/1994 |
| WO | 2010084453 A1 | | 7/2010 |
| WO | WO 2011/072063 | * | 6/2011 ............ F16J 9/062 |

* cited by examiner

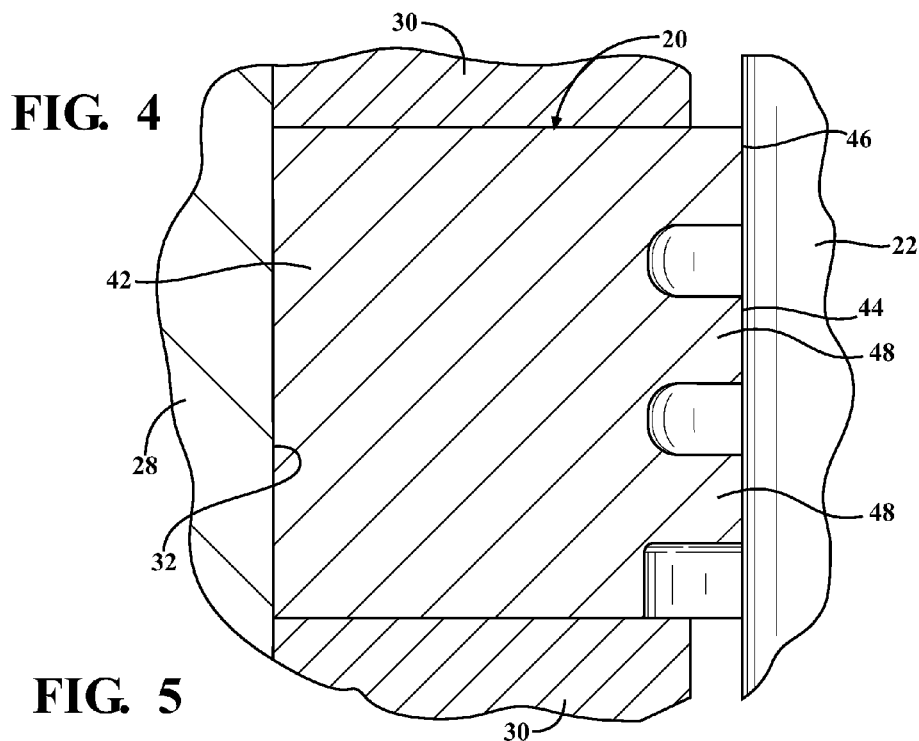
FIG. 4
FIG. 5
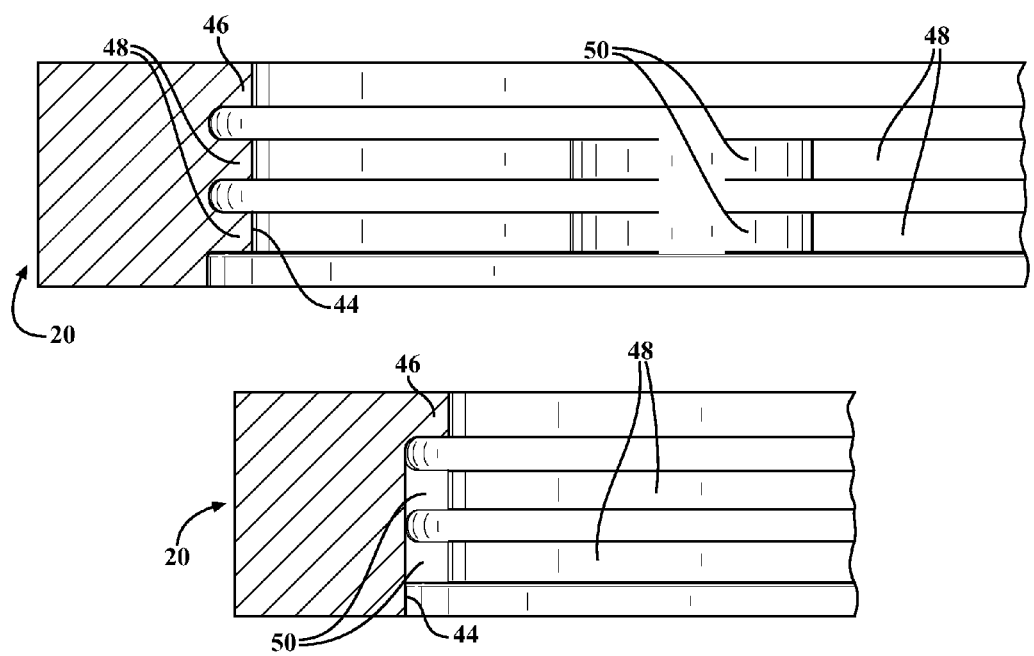
FIG. 6

PISTON RING FOR AN INTERNAL COMBUSTION ENGINE

CROSS REFERENCE TO RELATED APPLICATION

This application claims the benefit of application serial number 61/600,285 filed Feb. 17, 2012.

BACKGROUND OF THE INVENTION

1. Field of the Invention

The present invention relates generally to internal combustion engines having at least one reciprocating piston within a cylinder, and more particularly to seals between the reciprocating piston and a cylinder wall.

2. Related Art

Typical internal combustion engines are provided with at least one piston body which reciprocates within a cylinder of an engine block. In general, each piston body includes a plurality of ring grooves, each of which receives and operably supports a piston ring. In operation, the piston rings remain in the ring grooves and travel with their respective piston bodies in a reciprocating motion within cylinders of an engine block. Among other things, the pistons rings function to seal combustion gasses in a combustion chamber above the piston body, to transfer heat from the piston body to the cylinder wall, to restrict the passage of oil from the crank case to the combustion chamber and to provide a generally uniform oil film on the cylinder wall. Such piston rings are typically biased with a spring force in a radially outward direction against the cylinder wall to establish the seal between the piston body and the cylinder wall.

SUMMARY OF THE INVENTION

One aspect of the present invention provides for a piston ring for sealing a cylinder wall to a piston body. The piston ring includes a ring body which extends substantially circumferentially around an axis and has an inner face that faces the axis. The inner face includes a plurality of axially spaced and radially inwardly extending contact features. The ring body is of an elastically deformable material for biasing the contact features of the inner face into engagement with the piston body to establish a seal therebetween. At least one of the radially inwardly extending contact features extends substantially continuously around a circumference for establishing a substantially continuous seal around the piston body, and at least one of the radially inwardly extending contact features is non-continuous and includes at least one recessed area for allowing the passage of oil and gas therethrough.

The piston ring may be seated in a channel of a cylinder wall to establish the seal between the cylinder wall and the piston body. As such, the piston ring remains generally stationary and does not move relative to the cylinder wall during operation of the engine. This location allows for increased stability of the piston body as it reciprocates in the cylinder of the engine without compromising the length of the skirt, i.e. the skirt may extend downwardly past the cylinder wall when the piston body is in a bottom dead center position. The piston ring is also resistant to blow by.

According to another aspect of the present invention, the plurality of contact features is at least three contact features including an upper contact feature and a plurality of lower contact features. The upper contact feature is substantially circumferentially continuous, and each of the lower contact features has at least one recessed area. The recessed areas of the lower contact areas are aligned rotationally with one another to enhance the drainage of oil scraped by the substantially continuous upper contact feature.

Yet another aspect of the present invention provides for a power cylinder assembly. The power cylinder assembly includes a cylinder wall having a circumferentially extending channel formed therein and a piston body with a skirt. At least a portion of an outer surface of the skirt extends substantially continuously around a circumference with a skirt diameter. A piston ring is disposed, or seated, within the channel of the cylinder wall for establishing a seal between the cylinder wall and the piston body. The piston ring has a ring body that is of an elastically deformable material and extends substantially circumferentially around an axis. The ring body has an inner face which faces towards the axis and has a plurality of axially spaced and radially inwardly extending contact features. At least one of the contact features is substantially circumferentially continuous and has a generally uniform ring diameter when in a relaxed condition. The ring diameter is less than the skirt diameter of the piston body. The ring body substantially circumferentially surrounds the circumferentially continuous portion of the skirt with the contact features on the inner face being biased against the skirt of the piston body to establish the dynamic seal between the cylinder wall and the piston body.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 4 is a cross-sectional and fragmentary view showing the piston ring of FIG. 1 disposed within a channel of a cylinder wall and in sealing engagement with a piston body;

FIG. 5 is a cross sectional and fragmentary of the piston ring of FIG. 1;

FIG. 6 is another cross-sectional and fragmentary view of the piston ring of FIG. 1 and taken from a different location than FIG. 5;

DESCRIPTION OF THE ENABLING EMBODIMENT

Figure 1:
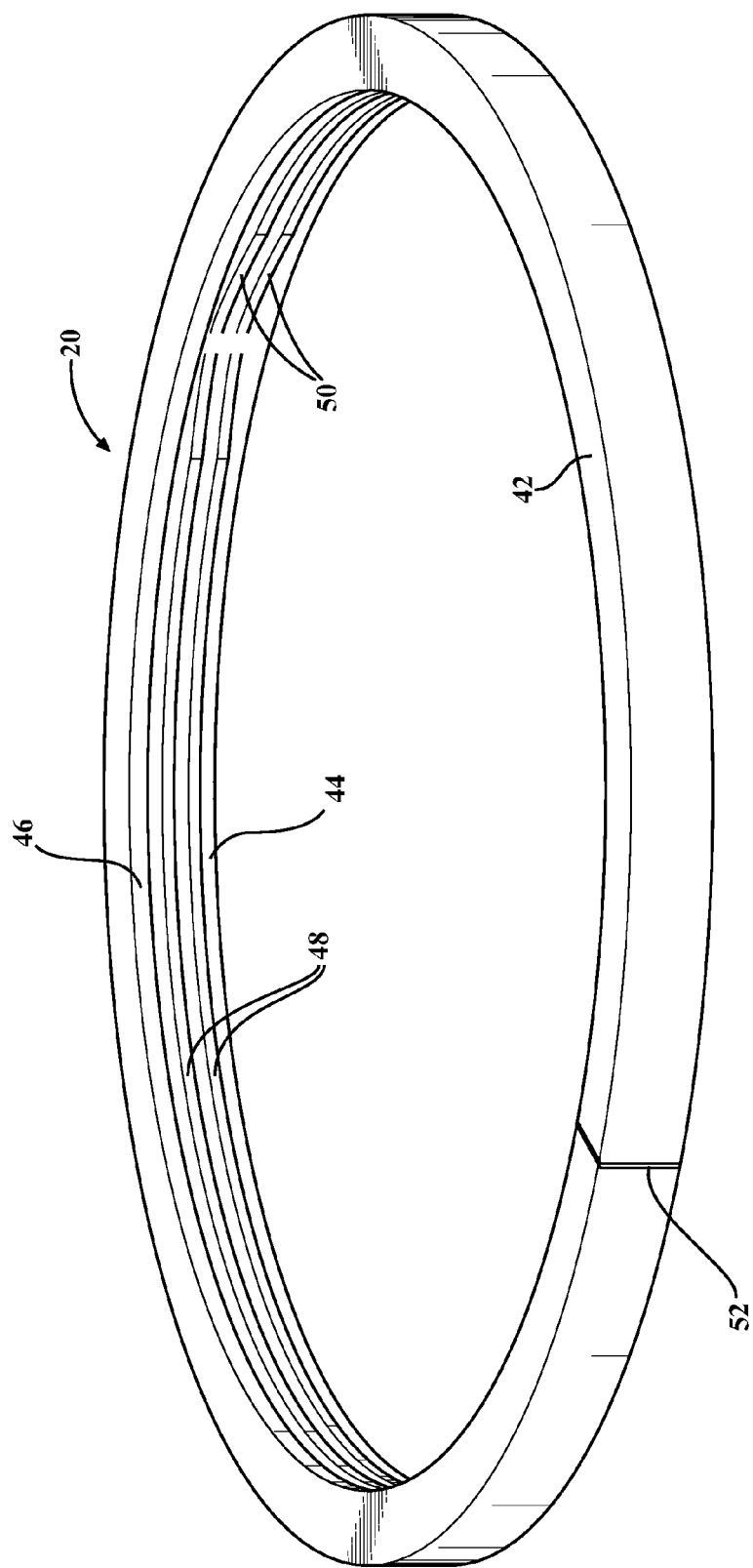
FIG. 1 is a perspective and elevation view of an exemplary embodiment of a piston ring.

Referring to the Figures, wherein like numerals indicate corresponding parts throughout the several views, an exemplary embodiment of a piston ring 20 for sealing a piston body 22 to a cylinder wall 24 of a power cylinder assembly 26 of an internal combustion engine is generally shown in FIG. 1. Referring now to the cross-sectional views of FIGS. 2 and 3, the exemplary piston ring 20 is shown as installed in a power cylinder assembly 26 of an internal combustion engine having an engine block 28 and a two-piece cylinder liner 30 which together present an axially extending cylinder wall 24 having a channel 32 that extends substantially circumferentially around the cylinder wall 24. Specifically, in the exemplary embodiment, the piston ring 20 is disposed between ends of the cylinder liner 30 pieces which are spaced axially from one another to present the aforementioned channel 32. However, it should be appreciated that the channel 32 could be formed into the cylinder wall 24 through a range of different manners. For example, the channel 32 could be formed directly into the engine block 28 without any cylinder liner 30. The exemplary piston ring 20 is shown installed in a diesel fueled compression ignition engine; however, it should be appreciated that the piston ring 20 could alternately be used in a range of different types of internal combustion engines including, for example, spark ignition engines or horizontally opposed two piston per cylinder engines.

Figure 2:
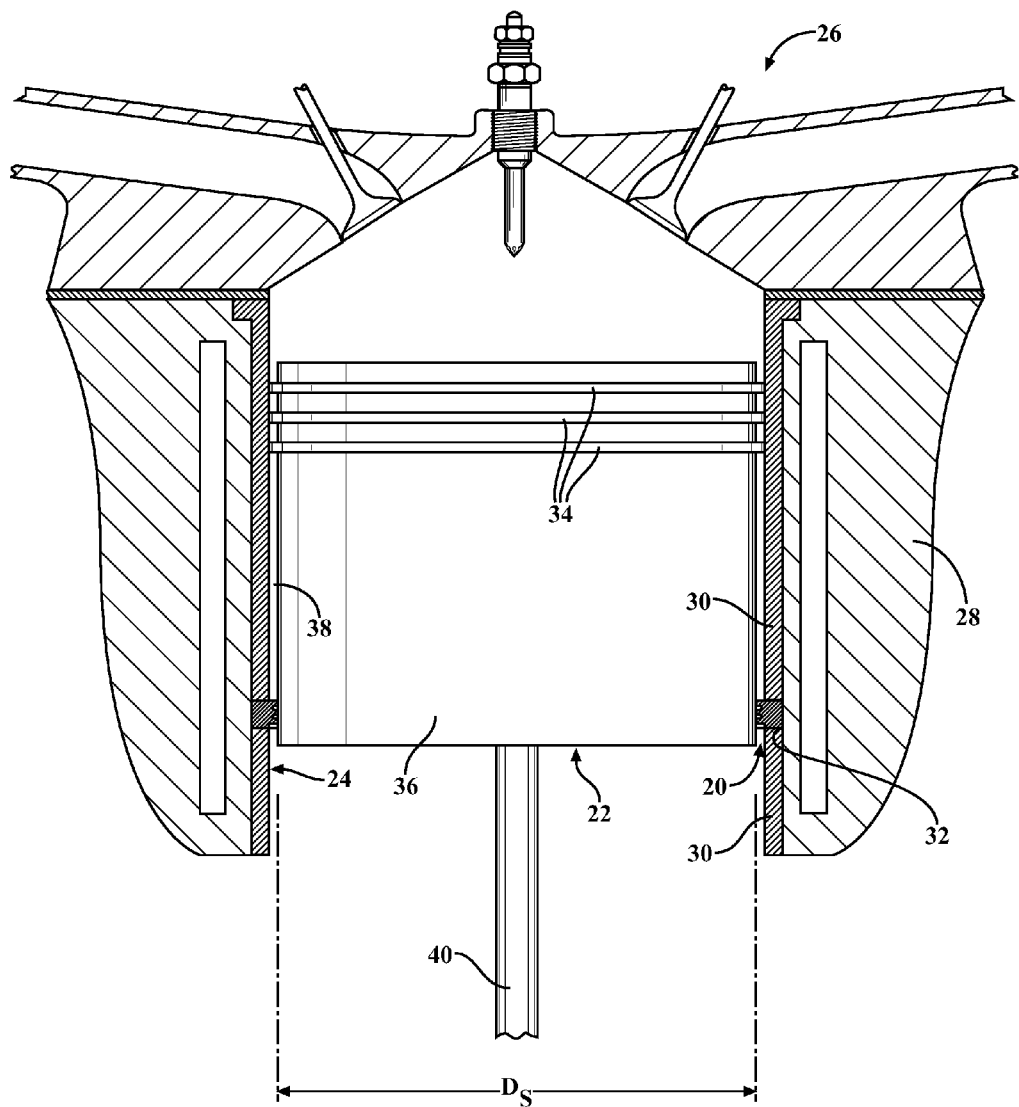
FIG. 2 is a sectional view of an exemplary embodiment of a power cylinder assembly and including the piston ring of FIG. 1 and showing a piston body in a top dead center position.
Figure 3:
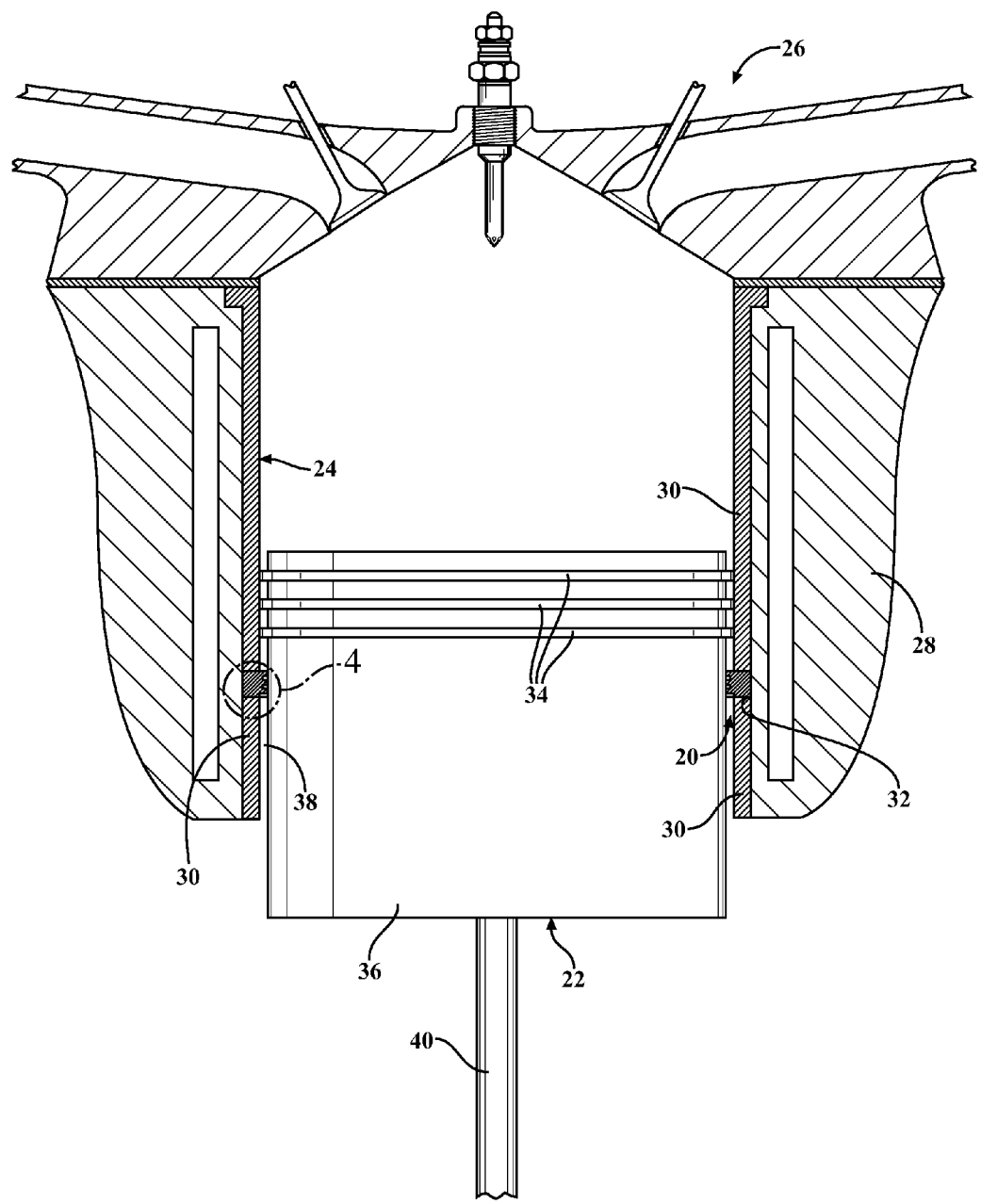
FIG. 3 is another sectional view of the exemplary embodiment of the power cylinder assembly with the piston ring of FIG. 1 and showing the piston body in a bottom dead center position.

Referring still to FIGS. 2 and 3, the piston body 22 of the exemplary power cylinder assembly 26 includes one or more upper piston rings 34 (a plurality being illustrated in the exemplary embodiment) which are carried in associated ring grooves formed in the outer wall of the piston body 22. The piston body 22 also has a skirt 36 which depends from the piston ring 20 region and helps guide the piston body 22 during reciprocation within the cylinder during operation of the engine. At least a portion of the skirt 36 is generally cylindrically-shaped and has an outer surface which extends continuously around a circumference. Specifically, the outer surface of the circumferentially continuous portion of the skirt has a skirt diameter $D_S$. This portion of the skirt 36 is sized to be close to but relatively smaller than the inner diameter of the cylinder wall 24 such that there is an operating gap 38 therebetween. The piston body 22 is coupled by a wrist pin (not shown) or a similar type of connection device to a connecting rod 40, which in turn is coupled to a crank shaft (not shown) or a similar mechanism.

Referring still to FIGS. 2 and 3, in its location in the channel 32 of the cylinder wall 24, the exemplary piston ring 20 is mounted stationarily relative to the engine block 28 and is sealed against the outer surface of the skirt 36 of the piston body 22 to establish a gas and fluid tight seal between the cylinder wall 24 and the piston body 22. The piston ring 20 has an inner face 42 (best shown in FIG. 4) that is in running contact with the skirt 36 of the piston body 22 during operation of the engine to seal combustion gasses in the combustion chamber on one side of the piston body 22 and to seal oil on the other side of the piston body 22, e.g. in a crank case (not shown) or any other oil chamber. During operation of the engine, the piston body 22 moves up and down within the cylinder wall 24 between a top dead center position shown in FIG. 2 and a bottom dead center position shown in FIG. 3. As shown, the exemplary piston ring 20 remains in sealing engagement with the circumferentially continuous portion of the skirt 36 to maintain the gas and oil tight seal throughout the piston body's 22 range of travel. The location of the piston ring 20 in the channel 32 of the cylinder wall 24 allows for increased stability of the piston body 22 as it reciprocates in the cylinder of the engine without compromising the length of the skirt 36, i.e. the skirt 36 may extend downwardly into the crank case (not shown) when the piston body 22 is in the bottom dead center position.

Figure 7:
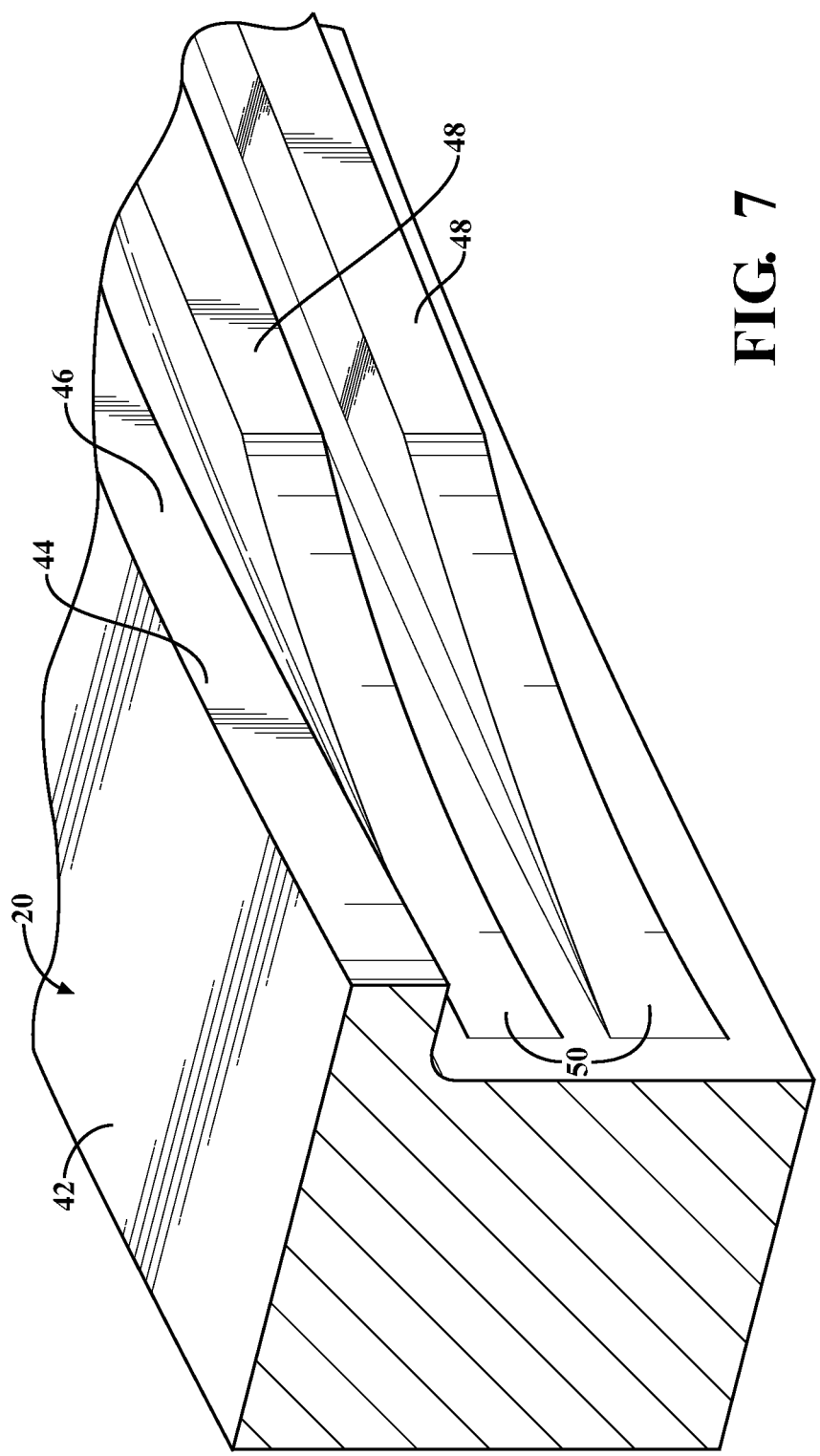
FIG. 7 is a sectional, perspective and fragmentary view of the piston ring of FIG. 1.
Figure 8:
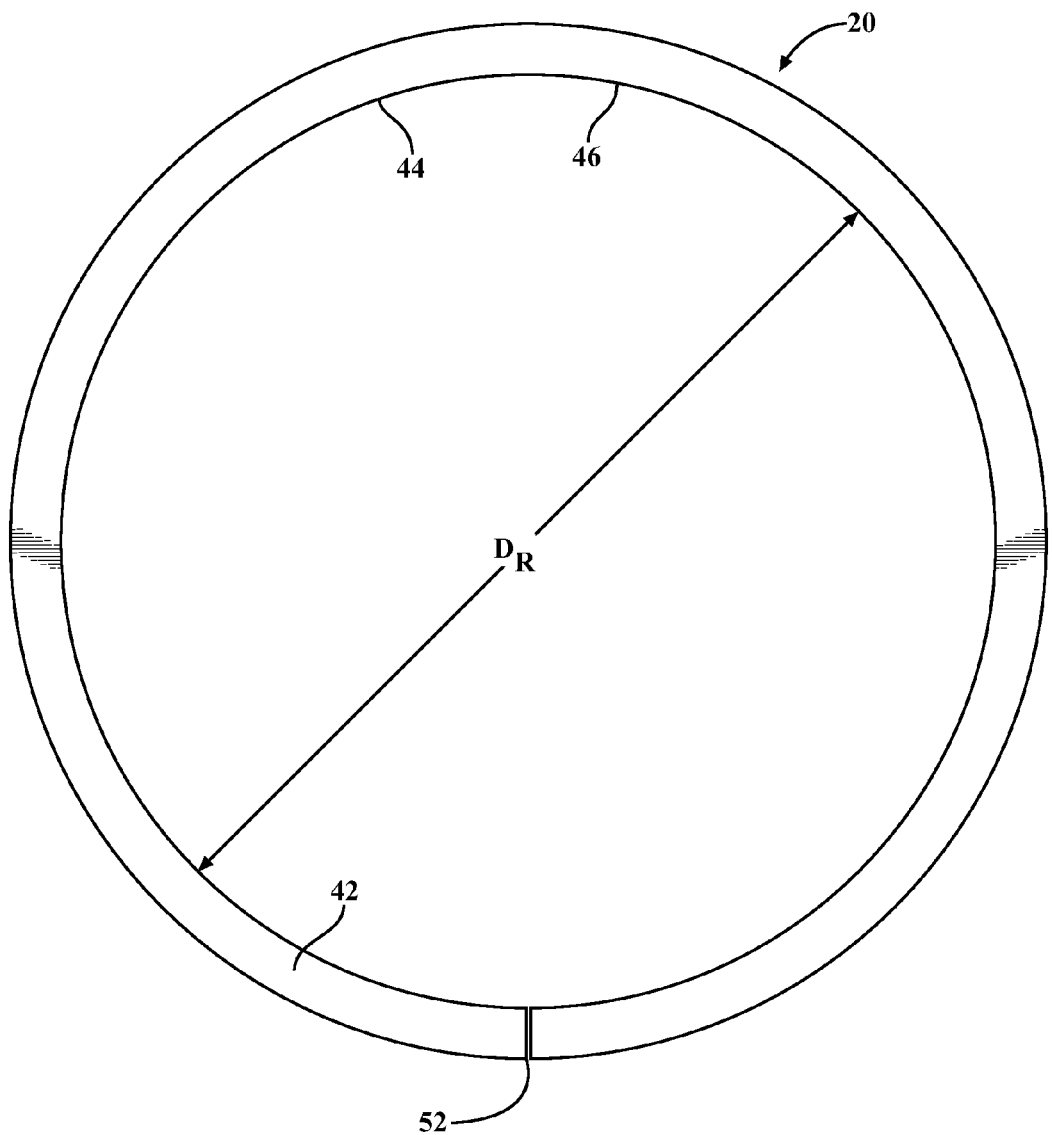
FIG. 8 is a top view of the piston ring of FIG. 1.

Referring back to FIG. 1, the piston ring 20 includes a ring body 42 which extends substantially circumferentially about an axis. The ring body 42 has an inner face 44 which faces towards the axis and has a plurality of axially spaced and radially extending contact features 46, 48. Specifically, as best shown in FIGS. 5-7, in the exemplary embodiment, the ring body 42 has three contact features 46, 48 including an upper contact feature 46 and a plurality lower contact features 48 (shown as a pair of lower contact features 48). As best shown in FIG. 8, the upper contact feature 46 extends substantially circumferentially continuously with a generally uniform ring diameter $D_R$ when in an at rest condition. The ring diameter $D_R$ is less than the skirt diameter $D_S$ of the piston body 22. Referring now to FIGS. 5 and 6, the lower contact features 48 are non-continuous and have recessed areas 50. As shown, the recessed areas 50 of the lower contact features 48 are aligned in a rotational direction with one another. Referring back to FIG. 1, the ring body 42 has ends which are spaced from one another by a ring gap 52, and the ends at least partially overlap one another. The overlapping could be with, for example, an angle joint, an overlapped joint, a convex step type joint, an angle step type joint, a hook joint, etc.

The ring body 42 is formed of an elastically deformable material, such as spring steel. To install the ring body 42 onto the skirt 36 of the piston body 22, the ring body 42 is spread to increase the ring diameter, and then the ring body 42 is inserted over the skirt 36. When the ring body 42 is released, it remains expanded partially by the relatively larger skirt 36 and strains towards the at rest condition to establish a dynamic seal with the piston body 22.

Referring now to FIG. 4, the ring body 42 is seated in the channel 32 of the cylinder wall 24 and establishes a dynamic gas and oil tight seal between the cylinder wall 24 and the piston body 22. In this location of the ring body 42, all three of the contact features 46, 48 are in sealing engagement with the piston body 22. Turning now to FIGS. 5 and 6, the alignment of the recessed areas of the lower contact features 48 enhances the drainage of oil that is scraped by the upper contact feature 46.

The edges of the contact features 46, 48 that are in engagement with the skirt 36 may be sharp (i.e. knife edges, ninety degree corners or less than ninety degree corners) to encourage good contact and oil scraping, could be rounded or could have any suitable geometry.

The ring body 42 may be formed through any desirable manufacturing process and may be of any suitable material that is elastically deformable including, for example, spring steel, other types of steel or cast iron. The ring body 42 may also either be uncoated or may have a wear resistant coating (such as chromium, chromium with aluminum oxide ceramic [CKS], chromium with microdiamond [GDC], etc.) applied to the inner face 44. The material and geometry of the ring body 42 are preferably chosen to provide a gas and oil tight seal between the cylinder wall 24 and the piston body 22 while minimizing the friction between the ring body 42 and the piston body 22.

The exemplary description of the embodiment is meant to be illustrative and not limiting of the invention. Variations and modifications to the disclosed embodiment may become apparent to those skilled in the art and come within the scope of the invention.

What is claimed is:

1. A piston ring for sealing a cylinder wall to a piston body, comprising:
a ring body having a width extending substantially circumferentially around an axis between opposite ring ends that are spaced from one another by a ring gap when said piston body is in an installed condition, said ring body having a height defined by a distance from a top surface to a bottom surface, said ring body having an inner face facing towards said axis, said inner face including a plurality of axially spaced and radially inwardly extending contact features, said ring body being of an elastically deformable material for biasing said contact features of said inner face into engagement with the piston body, at least one of said radially inwardly extending contact features extending substantially continuously around a circumference for establishing a substantially continuous seal around the piston body, a plurality of said radially inwardly extending contact features being non-continuous and including at least one recessed area for, wherein said recessed areas of said contact features are aligned circumferentially with one another to present a passage for enhanced oil drainage, wherein said passage extends a majority of said height of said ring body, wherein said ring gap when said ring body is in said installed condition has a gap length which is less than said width of said ring body, and wherein each of said recessed areas has a pair of ramping surfaces that are spaced from one another by a non-ramping surface that extends along a predetermined length between said ramping surfaces.

2. The piston ring as set forth in claim 1 wherein said ring body is of spring steel.

3. The piston ring as set forth in claim 1 wherein said ring body is uncoated.

4. The piston ring as set forth in claim 1 wherein only one of said contact features extends substantially continuously around the circumference.

5. The piston ring as set forth in claim 4 wherein said ring body includes a total of three contact features.

6. A power cylinder assembly, comprising:
a two-piece cylinder liner defining a cylinder wall with a channel formed therein, said channel extending circumferentially around said cylinder wall;
a piston body having a skirt with an outer surface;
a piston ring disposed in said channel of said cylinder wall and being biased against said skirt of said piston body;
said piston ring having a ring body that has a height and a width and that extends substantially around an axis between opposite ends that are spaced from one another by a ring gap, said ring body having an inner face facing towards said axis, said inner face including a plurality of axially spaced and radially inwardly extending contact features, at least one of said contact features being substantially continuous with a generally uniform ring diameter when in a relaxed condition, said ring diameter being that is less than said skirt diameter of said piston body, and a plurality of said contact features being non-continuous and including at least one recessed area and wherein said recessed areas of said contact features are aligned circumferentially with one another to present a passage for enhanced oil drainage, and wherein said passage extends a majority of said height of said ring body;
said ring gap between said ends of said ring body has a gap length that is less than said width of said ring body; and
each of said recessed areas of said contacting features having a pair of ramping surfaces that are spaced from one another by a non-ramping surface that extends along a predetermined length between the ramping surfaces.

7. The power cylinder assembly as set forth in claim 6 wherein said ring body is of spring steel.

8. The power cylinder assembly as set forth in claim 6 wherein said ring body is uncoated.

9. The power cylinder assembly as set forth in claim 6 wherein only one of said contact features extends substantially continuously around the circumference.

10. The power cylinder assembly as set forth in claim 9 wherein said ring body includes a total of three contact features.

* * * * *